Aug. 22, 1961  D. J. LOVELL  2,997,699
ELECTRO-OPTICAL POSITION INDICATOR SYSTEM
Filed Aug. 3, 1959
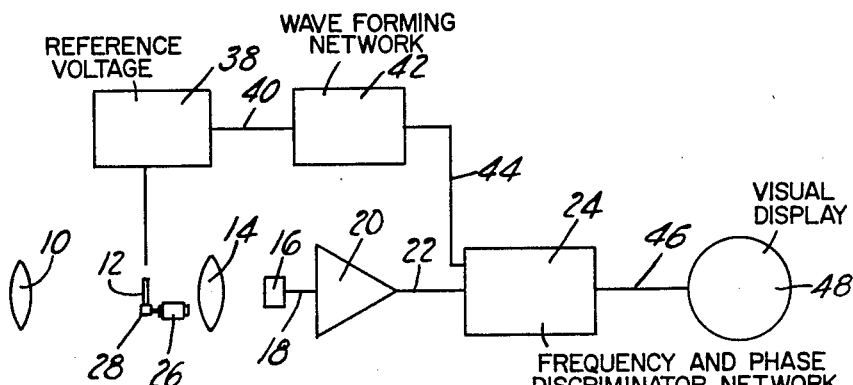
FIG. 1
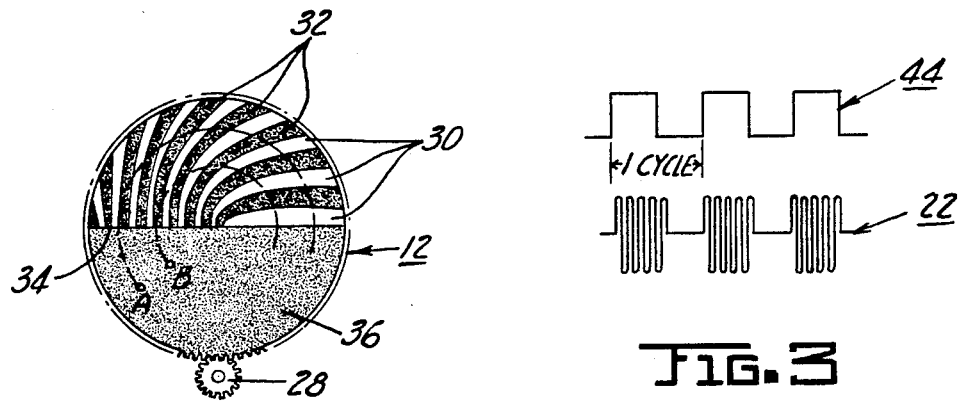
FIG. 2
FIG. 3
INVENTOR.
DONALD JOSEPH LOVELL
BY
James L. O'Brien
ATTORNEY

United States Patent Office 2,997,699
Patented Aug. 22, 1961

2,997,699
ELECTRO-OPTICAL POSITION INDICATOR SYSTEM
Donald J. Lovell, South Bend, Ind., assignor to The Bendix Corporation, a corporation of Delaware
Filed Aug. 3, 1959, Ser. No. 831,113
4 Claims. (Cl. 340—190)

The present invention relates to an electro-optical position indicator system for locating the position of a radiation source in two dimensions.

The indicator of the present invention is particularly useful in navigational systems, celestial tracking systems and systems for tracking relatively small radiation sources to transform photometric observations into electrical signals indicative of the two dimensional position of a radiation source. A rotating reticle formed with a plurality of alternately disposed curvilinear transparent and opaque portions over half the surface, the other half being semi-transparent, is placed at the focal plane of an optical system so as to be interposed between the radiation source and a transducer which transforms the received radiation into a series of electrical pulses the phase of which is indicative of the angular position of the source and the frequency of the oscillations comprising the pulse being indicative of the radial position of the source.

It is an object of the present invention to provide an electro-optical position indicator system in which the position of a radiation source is determined in two dimensions.

It is another object of the present invention to provide an electro-optical position indicator of simple construction and having few moving parts.

It is a further object of the present invention to provide an improved reticle for an electro-optical position indicator.

These and other objects and advantages of the invention will become readily apparent from the following description taken in connection with the accompanying drawings wherein:

FIGURE 1 is a schematic view of an electro-optical position indicator system embodying the present invention;

FIGURE 2 is an enlarged view of the reticle shown in FIGURE 1; and

FIGURE 3 is a view showing the wave forms of the signals appearing in a portion of circuit shown in FIGURE 1.

Referring now to the drawings and more particularly to FIGURE 1, numeral 10 designates a lens for focusing a radiation source in the plane of a reticle designated 12. A field lens 14 is provided to collect the radiation transmitted from reticle 12 and focus said radiation on a transducer 16 which produces an electrical signal in response to the radiation received through reticle 12. Transducer 16 is connected by means of conductor 18 to an amplifier 20 which in turn is connected by means of conductor 22 to a frequency and phase discrimination network designated 24.

Reticle 12 is rotated at a substantially constant speed by an electric motor 26 through a gear 28 which meshes with gear teeth formed on the periphery of the reticle.

As best seen in FIGURE 2, reticle 12 is formed with a plurality of alternately disposed curvilinear transparent and opaque portions designated respectively 30 and 32 which originate along a radius 34 of the reticle and extend to the periphery of the reticle. The alternate portions 30 and 32 are formed with equal arcuate widths at equal radii. The remainder 36 of the reticle not occupied by the portions 30 and 32 is of substantially constant opacity. The degree of opacity of remainder 36 may be varied but must be less transparent than the transparent portions 30. In the preferred embodiment, the reticle is circular with opaque remainder 36 consisting of one-half of the reticle.

As shown in FIGURE 1, a reference voltage pickoff 38 is disposed to be energized once per revolution of the reticle to produce an electrical signal in timed relation to the rotation of the reticle. The reference voltage pickoff 38 is connected by means of conductor 40 to voltage forming network 42 which shapes the reference signal into the desired shape. In a preferred embodiment, voltage forming network 42 shapes the reference signal into a square wave. The output of network 42 is connected by means of conductor 44 to the frequency and phase discrimination network 24.

In FIGURE 3, the electrical signals in conductors 44 and 22 are displayed in a manner to show the phase relationship between the signals as well as the frequency of the signal in conductor 22. The wave form in conductor 22 is illustrated for the radiation source B shown in FIGURE 2 wherein the radiation has been transformed into an electrical signal having a frequency of five cycles per revolution of the reticle.

A similar wave form for the radiation source A shown in FIGURE 2 would have a frequency of seven and one-half cycles per revolution of the reticle. The radial position of a radiation source from the center of the reticle is thus determined by the frequency of the signal in conductor 22 which in turn is a function of the number of reticle portions 30 and 32 that traverse the source. The angular position of the radiation source is a function of the time delay or phase between the reference signal in conductor 44 and the beginning of the signal in conductor 22.

The frequency and phase discrimination network 24 receives the signals from conductors 22 and 44 and generates an output signal indicative of the angular and radial position of the source via conductor 46 to a visual display 48 or to a control system (not shown).

While only one embodiment of my invention has been described it will be readily apparent to those skilled in the art that changes or various arrangements of the parts may be made without departing from the spirit of the invention.

I claim:

1. An electro-optical position indicator for determining the position of a radiation source comprising a reticle divided into semi-circular sections, one of said sections being of substantially constant opacity, the other of said sections being formed with a plurality of alternately disposed curvilinear transparent and opaque portions originating in spaced relation from the center of said reticle along a radius thereof, said portions extending from said radius toward the periphery of said reticle and being of equal arcuate width at equal radii from the center of said reticle, means for rotating said reticle, means energized in timed relation to the rotation of said reticle to produce a reference electrical signal, transducer means for producing an electrical signal in response to radiation from said source passing through the transparent portions of said reticle, means for comparing the phase of said first and second mentioned electric signals to provide an output signal indicative of the angular position of the radiation source, and means for determining the frequency of said second mentioned electrical signal to provide an output signal indicative of radial position of the radiation source from the center of the reticle.

2. An electro-optical position indicator for determining the position of a radiation source comprising a reticle divided into semi-circular sections, one of said sections being of substantially constant opacity, the other of said sections being formed with a plurality of alternately disposed curvilinear transparent and opaque portions originating in spaced relation from the center of said reticle along a radius thereof, said portions extending from said radius toward the periphery of said reticle and being of equal arcuate width at equal radii from the center of said reticle, a lens adapted to form an image of said radiation source in the plane of said reticle, means for rotating said reticle, transducer means for producing an electrical signal in response to radiation passing through the transparent portions of said reticle, a field lens adapted to collect the image from said reticle and focus said image on said transducer means, means for producing a reference electrical signal in timed relation to the rotation of said reticle, means responsive to the time difference between the occurrence of said reference signal and the first occurrence of said first mentioned signal for generating an output signal indicative of the angular position of said source, and means responsive to the frequency of said first signal for generating an output signal indicative of the radial position of said source.

3. An electro-optical position indicator for determining the position of a radiation source comprising a reticle divided into semi-circular sections, one of said sections being of substantially constant opacity, the other of said sections being formed with a plurality of alternately disposed curvilinear transparent and opaque portions originating in spaced relation from the center of said reticle along a radius thereof, said portions extending from said radius toward the periphery of said reticle and being of equal arcuate width at equal radii from the center of said reticle, transducer means for producing an electrical signal in response to radiation from said source transmitting the transparent portions of said reticle, means for rotating said reticle whereby the frequency of said signal is a function of the number of tranpsarent portions traversing said source per revolution of the reticle, means for producing a reference electrical signal in timed relation to the rotation of said reticle, means responsive to the frequency of said first mentioned signal and the phase relationship between said first mentioned signal and said reference signal for generating an output signal indicative of the angular and radial position of said source.

4. A reticle for an optical system comprising a circular member divided into semi-circular sections, one of said sections being of substantially constant opacity and the other of said sections being formed with a plurality of alternately disposed curvilinear transparent and opaque portions originating in spaced relation from the center of said reticle along a radius of said reticle, and said portions being formed with equal arcuate widths at equal radii from the center of said reticle.

References Cited in the file of this patent

UNITED STATES PATENTS

| | | |
|---|---|---|
| 2,425,541 | Konet | Aug. 12, 1947 |
| 2,431,510 | Salinger | Nov. 25, 1947 |
| 2,713,134 | Eckweiler | July 12, 1955 |